United States Patent
Okada et al.

(10) Patent No.: US 8,071,234 B2
(45) Date of Patent: Dec. 6, 2011

(54) BATTERY PACK

(75) Inventors: Wataru Okada, Kobe (JP); Junya Yano, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 1010 days.

(21) Appl. No.: 12/005,340

(22) Filed: Dec. 27, 2007

(65) Prior Publication Data

US 2008/0160395 A1  Jul. 3, 2008

(30) Foreign Application Priority Data

Dec. 28, 2006  (JP) ................................. 2006-356318

(51) Int. Cl.
*H01M 2/10* (2006.01)
*H01M 4/00* (2006.01)
*H01M 10/50* (2006.01)

(52) U.S. Cl. .......................... 429/99; 429/120; 429/128
(58) Field of Classification Search ...................... 429/99
See application file for complete search history.

(56) References Cited

U.S. PATENT DOCUMENTS

| | | | | |
|---|---|---|---|---|
| 4,337,301 | A * | 6/1982 | Rorer et al. ..................... | 429/179 |
| 2006/0286441 | A1 * | 12/2006 | Matsuoka et al. .............. | 429/99 |
| 2007/0037051 | A1 * | 2/2007 | Kim et al. ..................... | 429/151 |

FOREIGN PATENT DOCUMENTS

| | | |
|---|---|---|
| EP | 1 225 651 | 7/2002 |
| EP | 1 753 058 | 2/2007 |
| JP | 3-291867 | 12/1991 |
| JP | 07-320775 | * 5/1994 |
| JP | 2006-066322 | * 8/2004 |
| JP | 2004-362879 | 12/2004 |
| JP | 2006-48996 | 2/2006 |

OTHER PUBLICATIONS

European Search Report (in English language) issued Feb. 12, 2008.

* cited by examiner

*Primary Examiner* — Ula C Ruddock
*Assistant Examiner* — Jacob Marks
(74) *Attorney, Agent, or Firm* — Wenderoth, Lind & Ponack, LLP

(57) ABSTRACT

A battery pack having a plurality of battery cells (10) connected in series and/or parallel. The battery pack is provided with a plurality of battery cells (10), each encased in a rectangular external case, and a plurality of separators (20) with electrical and heat insulating properties covering the outside of each battery cell external case excluding electrode terminals (12). Each separator (20) is disposed so as to intervene between adjacent battery cells (10) putting the external cases of those battery cells (10) in contact with both sides of the separator (20). With the external case of each battery cell (10) covered by separators (20) while exposing electrode terminals (12), the electrode terminals (12) are connected together. As a result, excluding required regions, the battery cells (10) can be enclosed and unintended events such as short circuits can be effectively prevented.

20 Claims, 21 Drawing Sheets

(a)

(b)

(a)

SL (b)

40

(c)

(a)

(b)

(a)

(b)

BATTERY PACK

BACKGROUND OF THE INVENTION

1. Field of the Invention

This invention relates to a battery pack having a plurality of rectangular batteries connected in series and/or parallel, and in particular to a battery pack for use in a battery driven vehicle such as a hybrid electric vehicle (HEV) or a pure electric vehicle (PEV).

2. Description of the Related Art

Higher output in a limited space is sought for a battery pack or battery array used as a power source in an electric vehicle or hybrid car. Consequently, rectangular batteries have been used, which have energy density superior to that of circular cylindrical batteries. However, in this type of battery pack with a plurality of rectangular batteries connected in series and/or parallel, adjacent rectangular battery cells are in close disposition. Therefore, the ability to efficiently radiate heat is imperative. In particular, lithium ion batteries can for some reason experience thermal runaway, and separators are used to thermally insolate adjacent battery cells (for example, refer to Japanese Patent Application Disclosures 2006-48996 and 2004-362879). In addition, these types of separators, which are disposed between rectangular batteries using metal external, cases, also serve to electrically insulate those battery cells.

SUMMARY OF THE INVENTION

In the prior art, separators are only sandwiched between surfaces of adjacent battery cells that would otherwise come in contact, and other regions of battery cell external cases are left exposed. Consequently, there is concern that adjacent battery cells could short circuit via their exposed regions. For a circular cylindrical battery, it is relatively easy to cover all but electrode terminal regions with material such as heat shrink tubing, but it is not easy to cover the entire outer surface of a rectangular battery leaving only the electrode terminals exposed. Further, since a safety valve, which releases gas if internal pressure rises abnormally, is provided on a rectangular battery, it is necessary to expose this type of safety valve as well as electrode terminals. This makes covering external surfaces of a rectangular battery even more difficult.

As a result, in prior art rectangular batteries, only (wide surface) side-walls of adjacent rectangular battery cells are segregated by separators, and upper surfaces, lower surfaces, and (narrow surface) side-walls are left exposed. Here there is concern, for example, that a tool dropped during assembly or unknowingly touched to an exposed terminal and metal surface of an external case could produce a short circuit or leakage current.

Further, to insulate the base region of an electrode terminal of a battery cell from surrounding external case regions, the electrode base region is sealed with insulating material such as resin or rubber. This type of sealing material can degrade over time or stress applied to the sealing material can result in an electrolyte leak. In this case, there is concern that short circuit can occur via leaked electrolyte solution causing a conductive path between electrodes.

The present invention was developed to solve these types of problems. Thus, it is a primary object of the present invention to provide a battery pack that improves insulation between adjacent rectangular battery cells.

The battery pack of the present invention has a plurality of battery cells connected in series and/or parallel and has the following configuration to achieve the object described above. The battery pack is provided with a plurality of battery cells each housed in a rectangular external case, and a plurality of separators with electrical and heat insulating properties covering the outside of each battery cell external case excluding electrode terminals. Each separator is disposed between adjacent battery cells to put the external cases of those battery cells in contact with both sides of the separator. With the external case of each battery cell covered by separators while exposing electrode terminals, those electrode terminals are connected together. As a result, excluding required regions, battery cells can be enclosed and unintended short circuits, etc. can be effectively prevented.

In addition, separators can have an interconnecting structure that allows adjacent separators to fit together. Because of this interconnecting structure, spaces to house battery cells can be formed by fitting separators of the same configuration together. As a result, separators can be fit together and battery cells can be disposed between adjacent separators to form a battery pack. This simplifies the connecting structure and not only reduces attachment materials such as screws, but also reduces labor in the assembly process by eliminating operations such as screw fastening. Further, with an interconnecting structure, shift in individual battery cell position can be prevented when assembled in battery pack form. In addition, by joining similarly configured separators together, a structure that covers all battery cell surfaces can be easily implemented while simplifying the structure of each separator.

A separator is formed in an open box shape with a bottom surface having a U-shaped cross-section where the open region is designed with a size and shape that can accommodate a battery cell. Further, when separators are fit together and linked, the connecting structure can dispose separators to close off the open region of one box-shaped separator with the bottom surface plate of an adjacent separator. The bottom surface plate forms the bottom surface of the open region of a box-shaped separator. In this way, the bottom, top and side surfaces of a rectangular battery cell can easily be covered by box-shaped separators. Since space to house battery cells is formed between separators by closing off open regions with sequential connection of individual separators in the same disposition, a structure that covers all battery cell surfaces can be easily implemented while simplifying the structure of each separator.

As an implementation of an interconnecting structure, interlocking projections can be formed on the rim of the open region of a separator and interlocking grooves that mate with the interlocking projections can be formed at corresponding locations on the opposite side of the bottom surface of the open region. Accordingly, by preparing a plurality of separators having the same shape, it becomes simple to fit interlocking projections in interlocking grooves and join multiple separator units together in the same disposition. Clearly, the same effect is obtained by establishing interlocking grooves on the rim of the open region of a separator and interlocking projections on the opposite side of the bottom surface of the open region. When a plurality of interconnecting elements are provided, it is also possible to establish an interlocking projection on one side of the rim of the open region and an interlocking groove on the other side while establishing an interlocking groove and interlocking projection in corresponding locations on the opposite side of the bottom surface of the open region.

Interlocking projections can also be established at the four corners, or at least the two diagonal corners, of the rim of the open region of a separator. By joining adjacent separators at corners, connecting strength can be maintained while reducing interlocking points.

In another interconnecting structure, interlocking projections can be made in the shape of keys and interlocking grooves can be in the form of slits that accept the key shapes. By this scheme, key shaped regions are inserted in interlocking slits to obtain reliable connection.

In the bottom surface of the open region of a separator where the external case of an enclosed battery cell contacts the separator surface, a plurality of depressions can be formed at given intervals. As a result, the depressed regions act as a layer of air and thermal insulation of the battery cell can be improved.

Further, in the bottom surface of the open region of a separator where the external case of an enclosed battery cell contacts the separator surface, a plurality of stepped regions in the form of depressions can be established at given intervals in an approximately parallel fashion. The ends of these extended stepped region depressions can be open at the side surfaces of the separator. By forcing a cooling medium into stepped region depressions having openings at side surfaces of the separators, battery cells housed in the separators can be efficiently cooled.

The bottom surface plate, which is the bottom surface of the open region of a separator, can be made with bends and folds to establish a cross-section having continuous depressions and projections and forming a bottom surface plate with stepped region depressions on both sides. As a result, stepped region depressions can be provided with respect to battery cells contacting both sides of the bottom surface plate, and cooling medium can be forced to each separate battery cell allowing effective cooling.

By establishing stepped region depressions parallel to the upper surface of a battery cell, which is provided with electrode terminals, cooling medium can be forced in from the side of a battery pack and can avoid surfaces of battery cells provided with electrode terminals. Therefore, electrode terminals are not directly exposed to the cooling medium and can be protected from dust and condensation to improve reliability.

Conversely, stepped region depressions can be established in a direction perpendicular to the upper surface of a battery cell, which is provided with electrode terminals. In this case, with the battery cells placed in an upright orientation, cooling medium can be forced in the direction of heat convection and cooling can take place with even more efficient heat transfer.

Safety valve openings can be formed in the separators at the location of safety valves provided in battery cells housed inside the separators. As a result, safety valves are not closed off by the separators and safety is maintained.

If separators are formed from resin materials, adjacent battery cells can be insulated electrically and thermally.

Electrolyte-absorbing sheets can be disposed around electrode terminals of the battery cells. Consequently, if electrolyte leaks from a battery cell, it can be absorbed by an electrolyte-absorbing sheet to avoid electrolyte spreading around the periphery of an electrode terminal and to prevent short circuit due to conducting liquid.

It is also desirable to form terminal sidewalls positioned to enclose the perimeter of each battery cell electrode terminal. In the off chance that electrolyte leaks from a battery cell, this allows accumulation of electrolyte in a reservoir region enclosed by the terminal sidewalls. This can effectively prevent electrolyte from flowing to other areas and developing a short circuit due to liquid conduction.

It is also possible to open one section of the terminal sidewalls and establish drain sidewalls that extend to the side surfaces of the separator. With this arrangement, drain sidewalls can guide electrolyte, which has leaked from a battery cell into the reservoir region enclosed by terminal sidewalls, to a side surface of the separator for safe discharge. This can remove leaked electrolyte while avoiding short circuit due to diffusion of the electrolyte. The above and further objects of the present invention as well as the features thereof will become more apparent from the following detailed description to be made in conjunction with the accompanying drawings.

DETAILED DESCRIPTION OF THE PREFERRED EMBODIMENT(S)

First Embodiment

Figure 1:
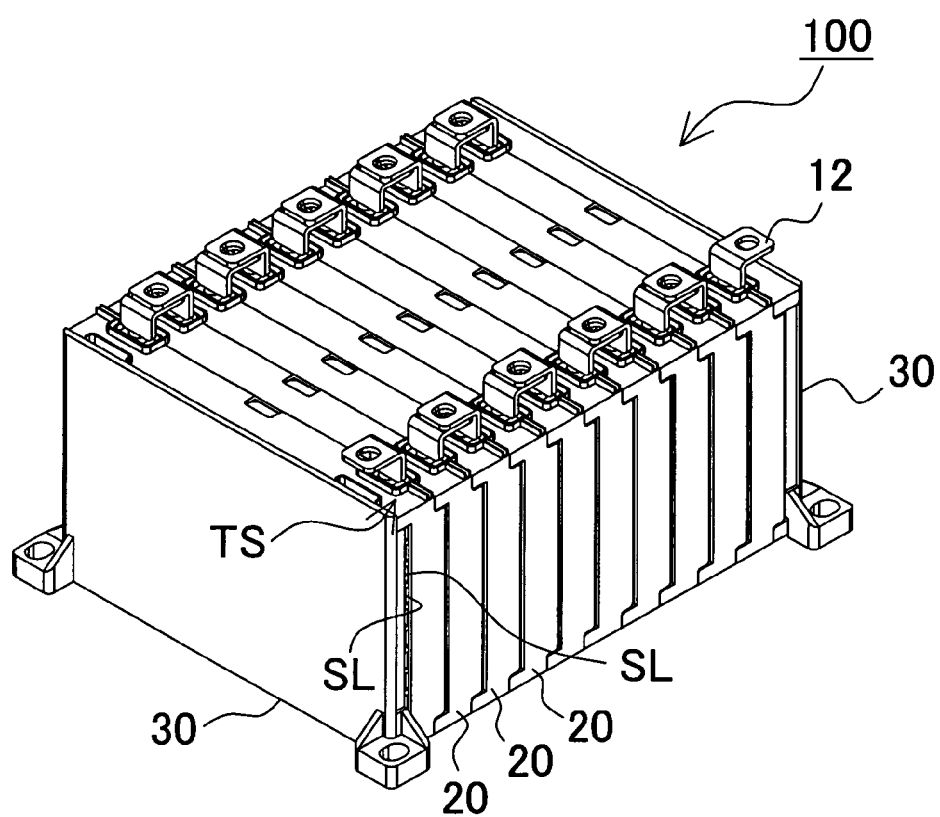
FIG. 1 is a perspective view of the exterior of a battery pack in accordance with a first embodiment of the present invention.
Figure 2:
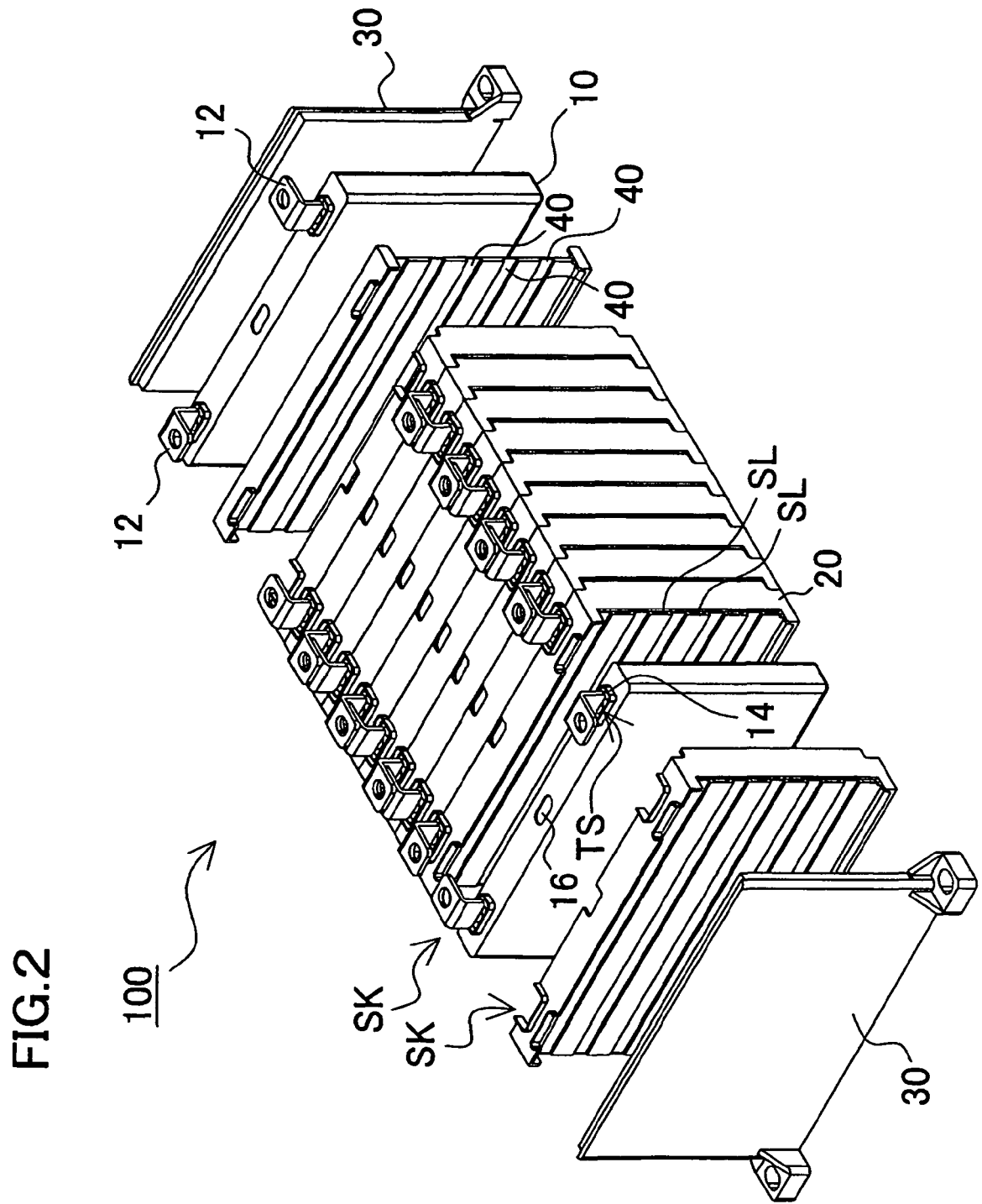
FIG. 2 is an exploded perspective view of the battery pack of FIG. 1.
Figure 3:
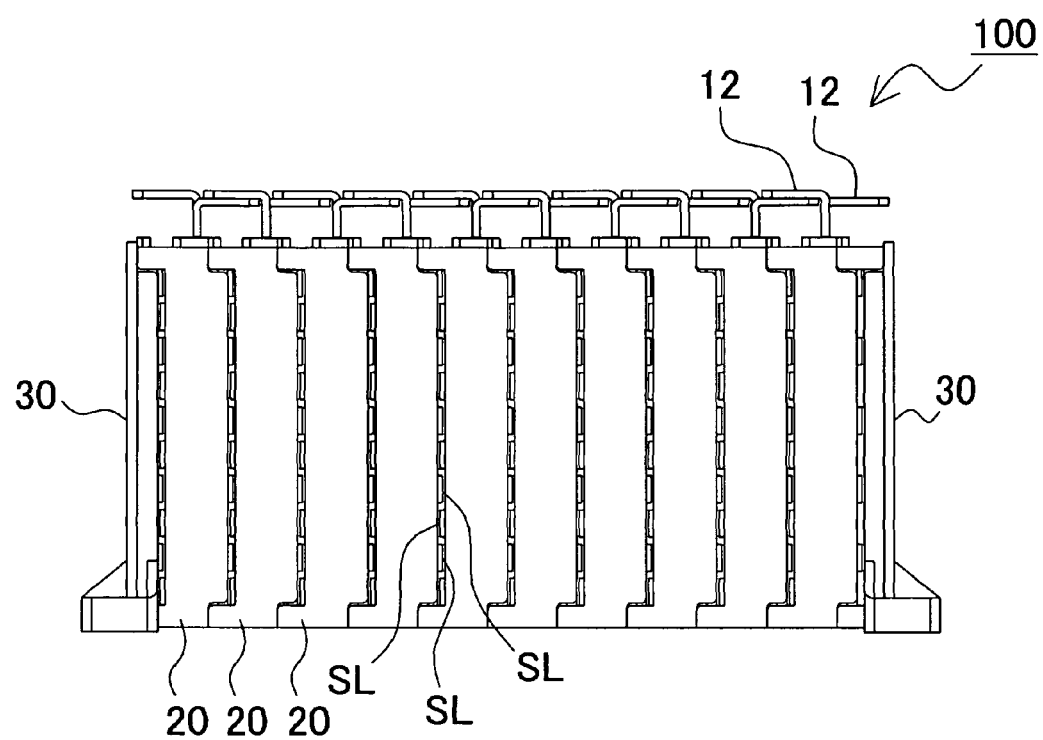
FIG. 3 is a side view of the battery pack of FIG. 1.
Figure 4:
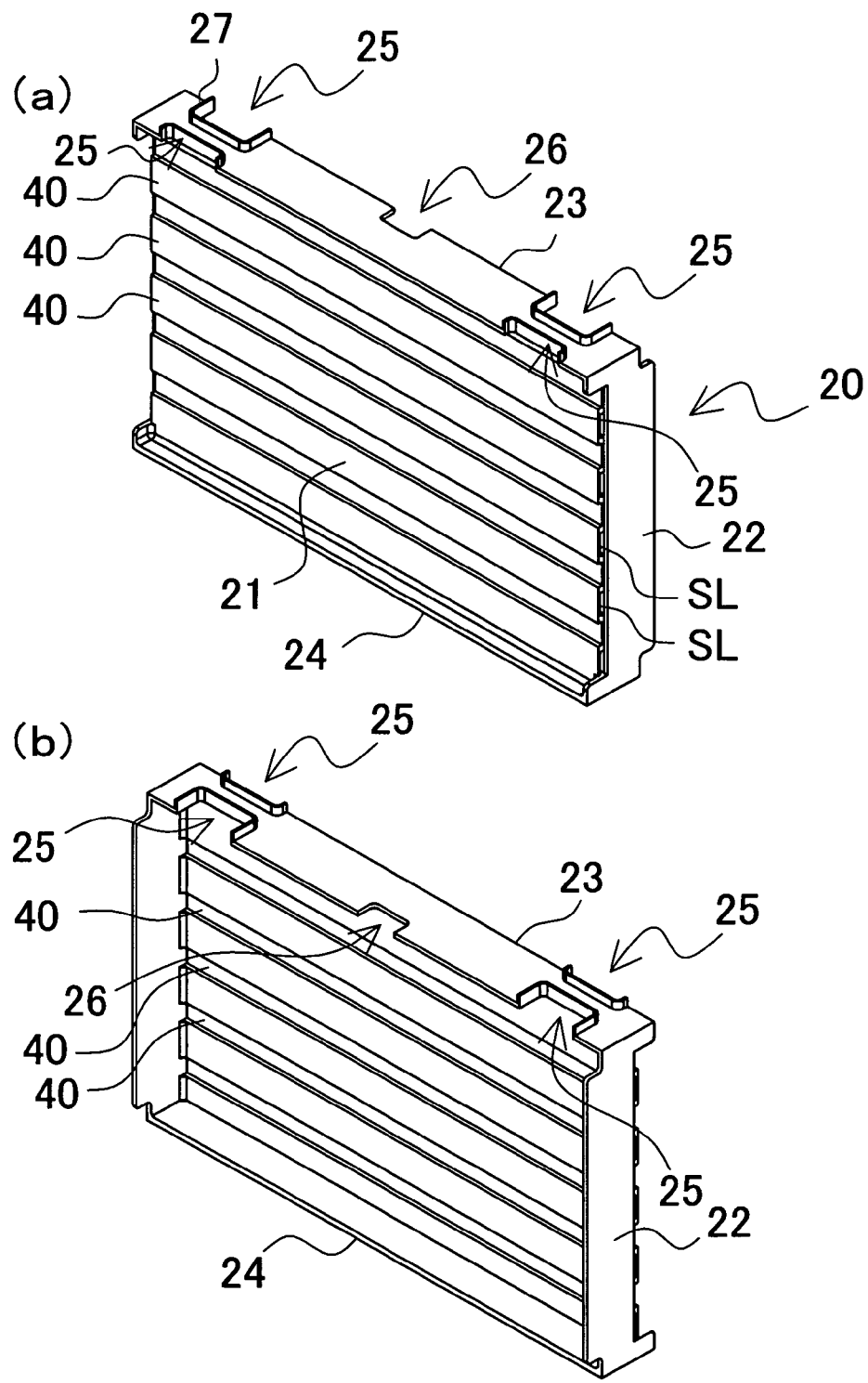
FIG. 4 shows perspective views of a separator; (a) is a perspective view from the backside of the bottom surface plate; and (b) is a perspective view from the front side of the bottom surface plate.
Figure 5:
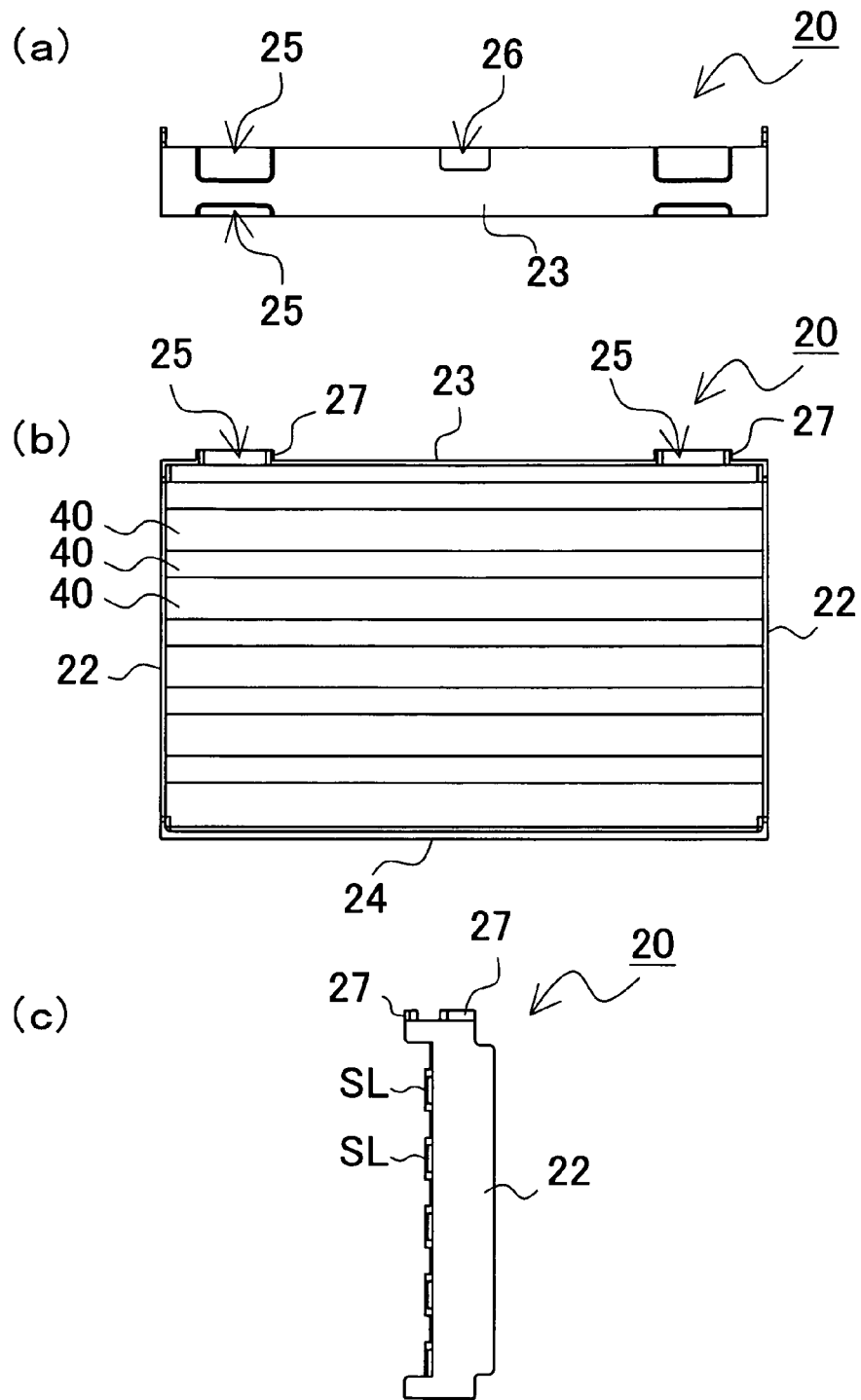
FIG. 5 shows three views of a separator; (a) is a plan view of the separator; (b) is a front view of the separator; and (c) is a side view of the separator.

FIG. 1 shows a perspective view of the exterior of a battery pack 100 constructed in accordance with the first embodiment of the present invention, FIG. 2 shows an exploded perspective view of the battery pack 100, FIG. 3 shows a side view of the battery pack 100, FIG. 4 shows perspective views of a separator 20, and FIG. 5 shows three other views of a separator 20. In FIG. 4, (a) shows a perspective view from the backside of the bottom surface plate, and (b) shows a perspective view from the front side, that is the open region side of the bottom surface plate of the separator. In FIG. 5, (a) shows a plan view, (b) shows a front view, and (c) shows a side view of the separator. The battery pack 100 shown in these figures is configured by stacking side-by-side a plurality of battery cells 10 and separators 20 in an alternating fashion and covering right and left end planes with end plates 30. Specifically, box shaped separators 20 are fit together to form holding spaces SK between separators 20 that house rectangular battery cells 10. Multiple units of battery cells 10 having covered surfaces are stacked together.

An approximately rectangular shaped battery enclosed in a rectangular external case is used as a battery cell 10. Compared with circular cylindrical batteries, rectangular battery cells can be housed efficiently and can increase energy density with respect to unit volume. In particular, there is great demand for space reduction in automobile applications. Rectangular rechargeable batteries, such as lithium ion rechargeable batteries can be used for these types of battery cells. However, other batteries such as nickel batteries and even non-rechargeable batteries can be used. Electrode terminals 12 of the battery cells 10 are connected in series or parallel. The battery pack 100 has a control circuit (not illustrated) connected in an end region. The control circuit measures voltage, current, and temperature of each battery cell 10, determines battery capacity and quantities such as the amount of required charge and discharge, and controls charging and discharging.

As shown in the exploded perspective view of FIG. 2, a battery cell 10 has positive and negative electrode terminals 12 protruding from the upper surface of a rectangular external case having side surfaces with truncated corners. Each electrode terminal 12 is bent in an L-shape and has a connecting hole opened through the bent part of the terminal. Specifically, as shown in FIG. 2, positive and negative electrode terminals 12 are bent in opposite directions and are formed in sizes and shapes making it possible to directly connect electrode terminals 12 of adjacent battery cells 10. As a result, positive electrodes and negative electrodes of adjacent battery cells 10 can be directly connected to simplify series or parallel connection of battery cells 10. Further, as shown in the battery cells 10 of FIG. 2, terminal ribs 14 are established in an upright disposition surrounding the perimeter of each electrode terminal 12, and the spread of electrolyte is prevented via these terminal ribs 14.

As shown in FIG. 2, each battery cell 10 is sandwiched on both sides between separators 20 to cover its exterior. As shown in FIG. 4, each separator 20 is formed in the shape of an open box having a bottom. Specifically, the bottom of the open region of the box shaped separator 20 is a bottom surface plate 21, which is slightly larger but essentially the same shape as a side of a battery cell 10. The box shape is formed by side surface plates 22 on the left and right of the bottom surface plate 21, an upper surface plate 23 above the bottom surface plate 21, a lower surface plate 24 below the bottom surface plate 21, and by those four surface plates extending in a direction perpendicular to the bottom surface plate 21. The space established by those surface plates forms one part of a battery cell 10 storage space SK. When another separator 20 is stacked in the same orientation, the open region is closed off by the backside of the bottom surface plate 21 of the other separator 20 and the storage space SK is formed. An interconnecting structure is realized by stacking a plurality of separators 20 side-by-side in the same orientation. In this way by using a plurality of separators 20 having the same shape, storage spaces SK for housing battery cells 10 are formed between adjacent separators 20. Separators 20 intervening between adjacent battery cells 10 are formed in box shapes and are designed to establish storage spaces SK between adjacent separators 20 when interconnected. This not only insulates adjacent battery cells 10, but covers battery cell 10 exteriors to improve safety using a minimum number of component parts. A structure that connects separators 20 having the same shape can reduce separator 20 manufacturing cost and reduce fabrication labor. In addition, by creating battery cell storage spaces SK via an interconnecting structure, alignment of each battery cell is simultaneously established. Each separator 20 is designed in a box shape with a bottom surface having an approximately u-shaped cross-section and with an open region having a size and shape that can accept a battery cell. When like separators 20 are joined in an interconnecting structure, the open region of a separator 20 is closed off by a bottom surface plate 21, which forms the bottom surface of the open region of another separator 20. As a result, rectangular battery cells can be efficiently housed in storage spaces SK formed in box shapes, and the exteriors of the battery cells can easily be covered at the same time.

Terminal feed-through openings TS are formed in the upper surface plate 23 of a separator 20 to allow electrode terminals 12 to pass through. Terminal feed-through openings TS are configured considering ease of assembly. Terminal feed-through openings TS are formed as approximately rectangular cutouts 25 in part of the upper surface plate 23, which forms the upper surface of a separator 20. When adjacent separators 20 are interconnected, corresponding cutouts 25 join to form openings. In the example of FIGS. 4 (a) and (b), cutouts 25 are formed near both ends of the lengthwise direction of the upper surface plate 23 and in two locations across the width for a total of four cutouts 25. In this manner, formation of terminal feed-Through opening TS for electrode terminals 12 is easily accomplished.

The upper surface plate 23 of a separator 20 is offset to allow it to sandwich electrode terminals 12 on both sides via the cutouts 25. Specifically, the upper surface plate 23 is fixed in a location offset with respect to the side surface plates 22 to position its lengthwise edges to intersect with electrode terminal positions. This allows terminal feed-through openings TS to be formed by cutouts 25 sandwiching the electrode terminals 12 from both sides. The size of respective cutouts 25 is determined considering the amount of upper surface plate 23 offset and the position of battery cell electrode terminals 12. In the example of FIG. 4 (a), the upper surface plate 23 is offset lower (below the bottom of the open region, to the left in FIG. 4 (a)) than side surface plates 22, and the upper (to the right in FIG. 4 (a)) cutouts 25 are formed larger than the lower (to the left in FIG. 4 (a)) cutouts 25. By interconnecting two separators 20, corresponding upper and lower cutouts 25 join to form terminal feed-through openings TS. Consequently, upper and lower cutouts 25 are designed in sizes and shapes that can form suitably sized terminal feed-through openings TS for the electrode terminals 12 when the cutouts 25 are joined together by connecting separators 20.

In examples such as shown in FIG. 4 (a), the upper surface plate 23 of the separator 20 is offset lower (below the bottom of the open region) than side surface plates 22. However, the same effect can be obtained by offsetting the upper surface plate 23 in the opposite direction (higher with respect to side surface plates 22). In this case, the upper (to the right in FIG. 4 (a)) cutouts 25 are formed smaller than the lower (to the left in FIG. 4 (a)) cutouts 25. Further, in examples such as shown in FIG. 4 (a), although the upper surface plate 23 and lower surface plate 24 are offset in the same direction, it is possible to offset them in opposite directions. For example, in FIG. 4 (a), the lower surface plate 24 can also be offset higher (to the right in FIG. 4 (a)).

As shown in FIG. 2, the upper surface of a battery cell 10 is provided with electrode terminals 12 near each end of the upper surface (in the lengthwise direction) and is provided with a safety valve 16 in the center region. The safety valve 16 is a valve that opens if battery cell internal pressure rises abnormally, and in that case, it serves to discharge gas inside the battery cell 10 to the outside. A safety valve opening 26 is formed in the upper surface plate 23 of a separator 20 at the location of the safety valve 16 of the battery cell 10 housed inside to expose the safety valve 16 externally. The safety valve opening 26 can be formed as a cutout in the separator 20. In this manner, battery cell exteriors can be covered to improve their electrical and thermal insulation without closing off the safety valve 16. Since both terminal feed-through openings TS and safety valve openings 26 can be formed as cutouts, separators 20 have the merit that they can be fabricated easily. Further, by forming the upper surface plate 23, side surface plates 22, and bottom surface plate 21 of the separator 20 as a single unit, manufacturing costs can be kept low. A separator 20 is made of material having superior high temperature properties and insulating properties, and preferably is made of lightweight, low-cost resin material. For example, a synthetic resin with low thermal conductivity (preferably $\leq 0.5$ W/m) such as polypropylene or polyurethane can be used.

Figure 6:
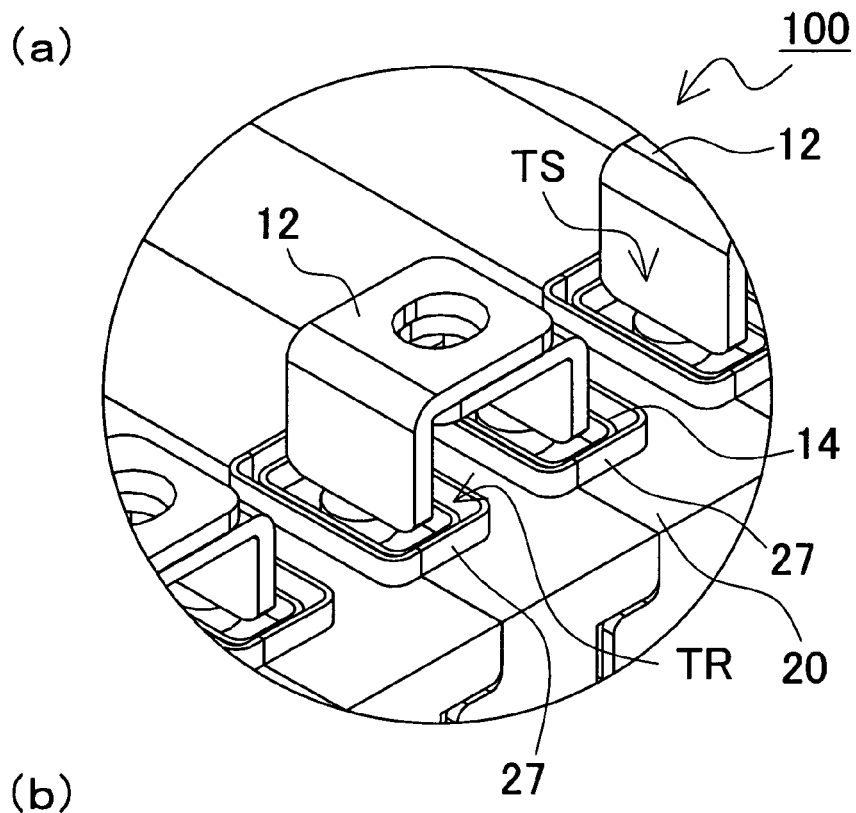
FIG. 6 is an enlarged perspective view showing the electrode through-hole region of the battery pack of FIG. 1.
Figure 6:
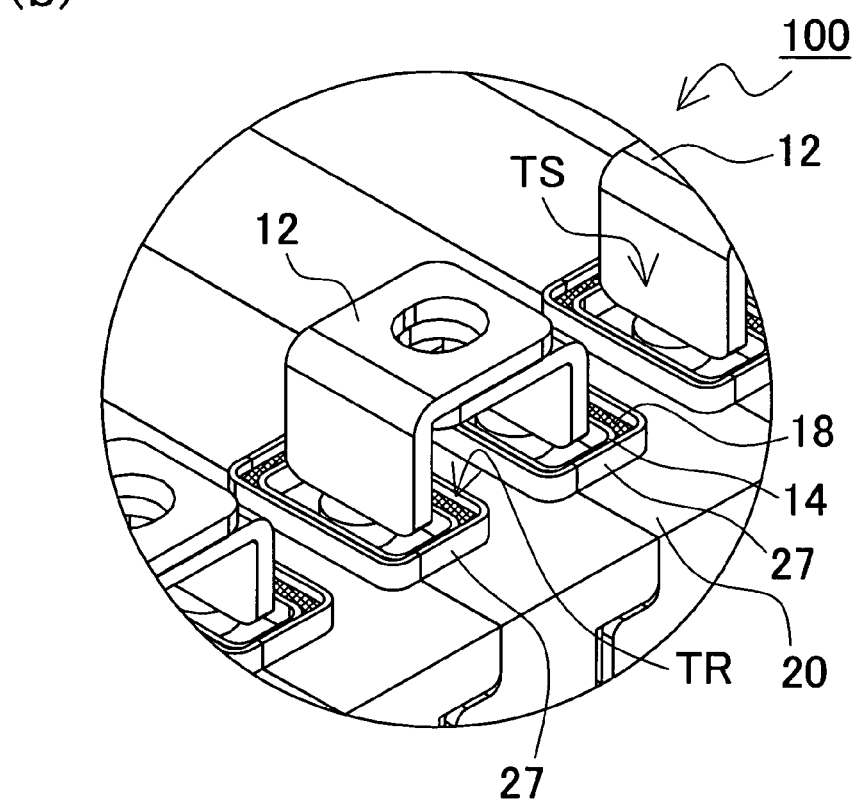

FIG. 6 shows enlarged perspective views of terminal feed-through opening regions. As shown in these figures, terminal sidewalls 27 are provided around the perimeters of terminal feed-through openings TS. Terminal sidewalls 27 protect electrode terminals 12 and establish reservoir regions TR inside the terminal sidewalls 27. Terminal sidewalls 27 are preferably formed from resin, etc. as a single unit with the separator 20, and are provided with insulating properties. In the example of FIG. 6, terminal sidewalls 27 are disposed surrounding terminal ribs 14 provided on the battery cell 10, and preferably are made higher than the terminal ribs 14. As a result, in the off chance that electrolyte leaks from the sealed base region of a battery cell electrode terminal 12, it can be collected in the reservoir region TR established by the terminal sidewalls 27, and the flow of electrolyte to other areas can be prevented to avoid short circuit due to the conducting liquid.

It is also desirable to dispose electrolyte-absorbing sheet around an electrode terminal 12. Electrolyte-absorbing sheet can be made from sheet material with superior absorbing properties that can absorb leaking electrolyte. This can prevent the flow of electrolyte and improve safety. FIG. 6 (b) shows an example of electrolyte-absorbing sheet 18 disposed in reservoir regions TR. In this example, ring shaped electrolyte-absorbing sheet 18 is inserted in reservoir regions TR between terminal ribs 14 and terminal sidewalls 27.

Second Embodiment

Figure 7:
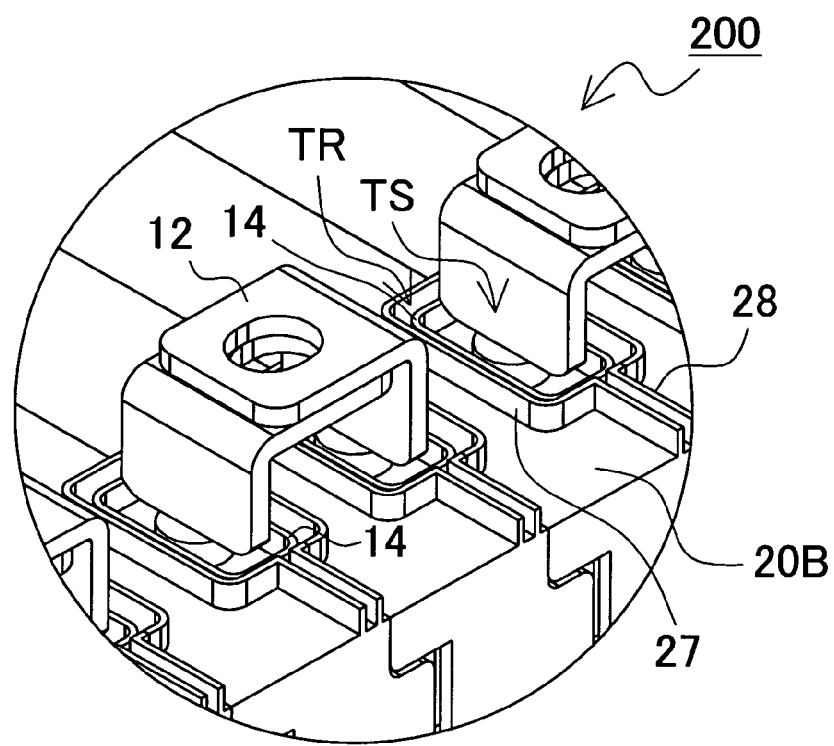
FIG. 7 is an enlarged perspective view showing the electrode through-hole region of a battery pack in accordance with a second embodiment.
Figure 8:
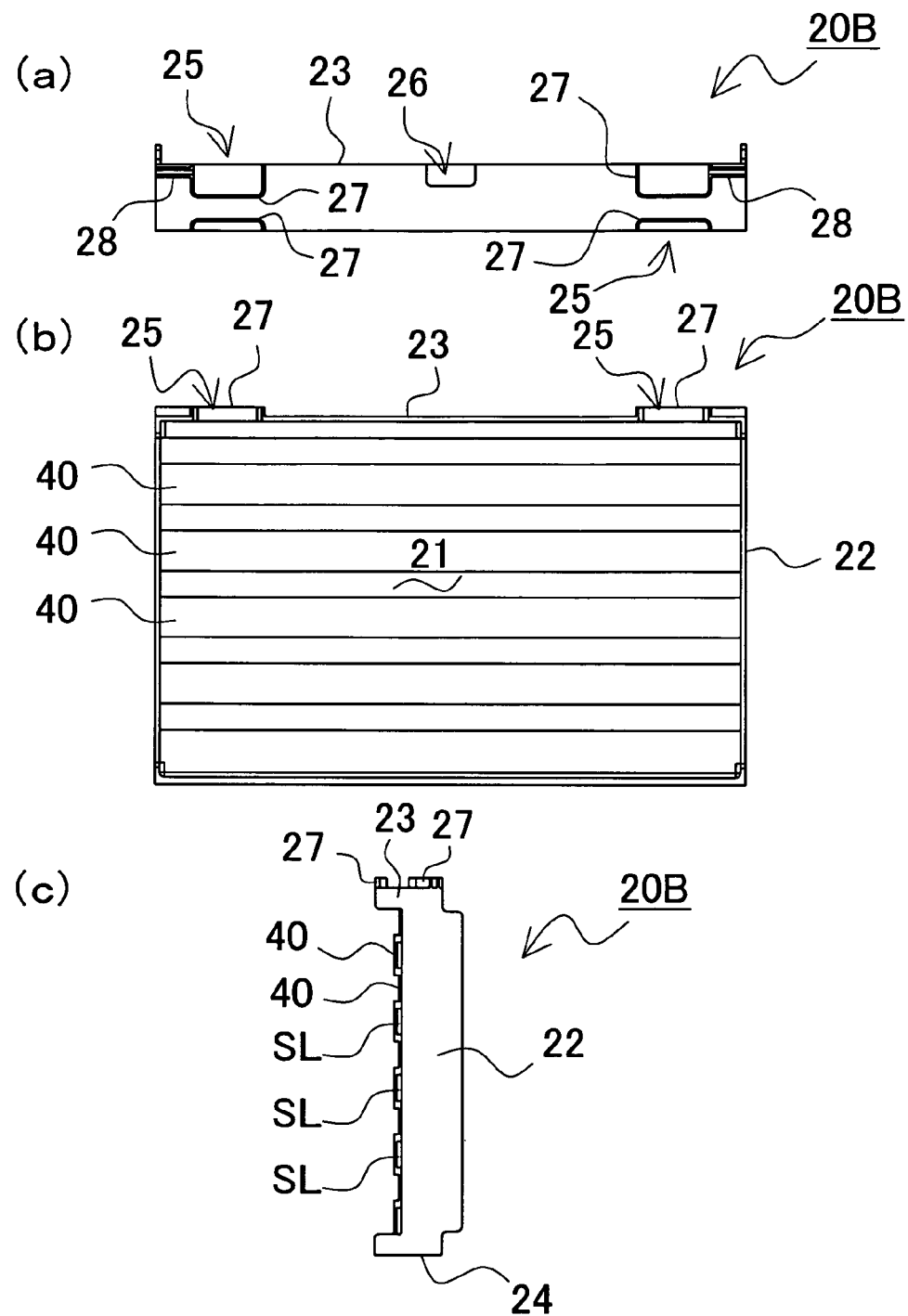
FIG. 8 shows three views of a separator; (a) is a plan view of the separator; (b) is a front view of the separator; and (c) is a side view of the separator.

A configuration to discharge electrolyte from reservoir regions can also be provided. FIG. 7 shows an enlarged perspective view of terminal feed-through opening TS regions of a battery pack 200 in the second embodiment. In FIG. 8, (a) shows a plan view of the separator 20B, (b) shows a front view of the separator 20B, and (c) shows a side view of the separator 20B of the second embodiment. One section of the terminal sidewalls 27 shown in these figures can be opened and drain sidewalls 28 can be established that extend to a side surface of the separator 20B. The drain sidewalls 28 form a discharge path for the electrolyte. With this arrangement, drain sidewalls 28 can guide electrolyte collected in a reservoir region TR to a side surface of the separator 20B for safe discharge. This can safely discharge electrolyte while avoiding short circuit due to the spread of the electrolyte.

A separator 20 has stepped region depressions 40 formed in its bottom surface, which contact battery cells 10. Stepped region depressions 40 are formed on both sides of the bottom surface plate 21. When separators 20 are interconnected to form storage spaces SK for battery cells 10, battery cells 10 contacting both sides of a bottom surface plate 21 are thermally insulated. In the example of FIG. 4, a bottom surface plate 21 is formed with stepped region depressions 40 on both sides by making bends and folds in the bottom surface plate 21 itself to establish continuous depressions and projections. In this example, a plurality of horizontal stepped region depressions 40 extends in an approximately parallel fashion. As shown in FIG. 4, the ends of the extended depressions are released while the ends of the extended projections form enclosed openings with the side surfaces of the separator 20. As shown in FIG. 3, when separators 20 are stacked together, depression end regions also become enclosed and stepped region depressions 40 establish slit SL openings at the side surfaces. By introducing cooling medium into the slits SL, battery cells 10 housed inside the separators 20 can be efficiently cooled. Coolant such as air can be used as the cooling medium, and it can be transferred via fan, etc. In the example of FIG. 4, although the cross-sectional shape of the stepped region depressions 40 is rectangular, the cross-sectional shape of the stepped region depressions 40 is not limited to rectangular. For example, stepped region depressions with flange-shaped depressions can also be formed. Further, depressions are not limited to stepped region depressions and a plurality of individual depressions (cavities) can also be formed in the bottom surface plate of a separator. In this case, a battery cell can be thermally insulated via an air layer in individual depressions, but a cooling medium cannot be forced through the depressions.

By providing a plurality of stepped region depressions in a horizontal direction, slit openings at the upper surface, where battery cell 10 electrode terminals 12 are provided, can be avoided. Since the cooling medium can be introduced at the side surfaces of the battery pack 100, electrode terminals 12 are not directly exposed to cooling air, and electrode terminals 12 can be protected from dust and condensation to improve reliability. Coolants such as air or gas can be used as the cooling medium, and a device such as a fan is connected to ducts to forcibly transport the cooling medium.

As described above, separators 20 and battery cells 10 are alternately stacked together in a linked configuration and end planes are covered and fixed in place with end plates 30. An end plate 30 is formed with a size that can cover a battery cell 10 exposed at the end of the battery pack 100 and can be fixed to hold that battery cell 10. As a battery pack 100 for automobile applications, bolt holes are established at four corners for mounting. End plates 30 are preferably formed as single units using materials such as metal or resin. Since no electrode terminals 12 pass through the cutouts 25 of terminal feed-through openings TS that face an end plane, a battery cell 10 positioned in an end region is exposed through the cutouts 25. Therefore, it is preferable to provide a plate on the upper surface of an end plate 30 that closes off those cutout regions.

Third Embodiment

Figure 9:
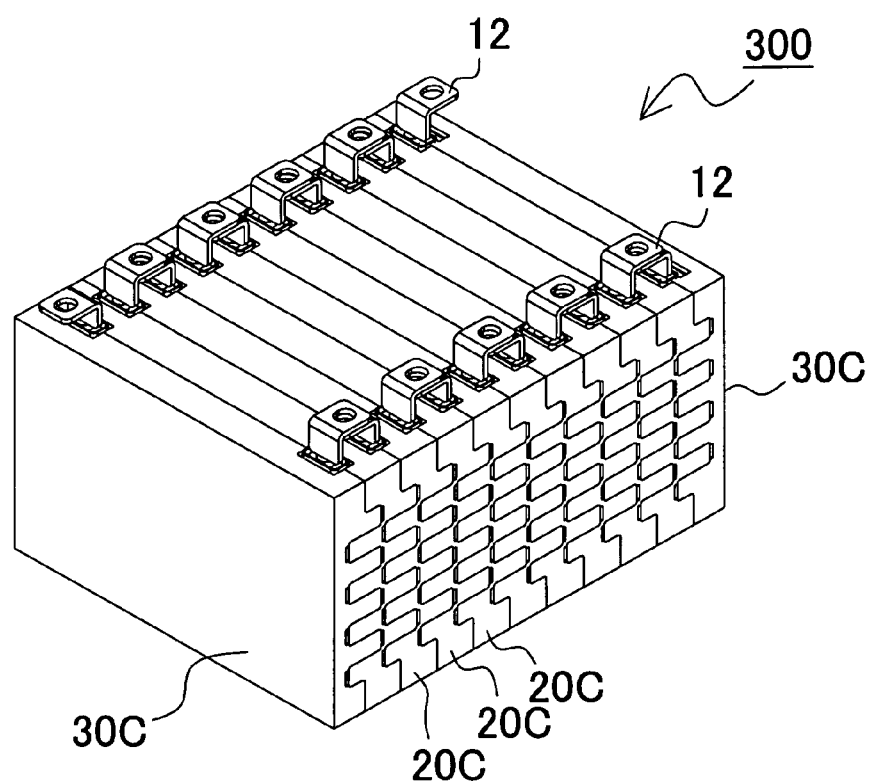
FIG. 9 is a perspective view of a battery pack in accordance with a third embodiment.
Figure 10:
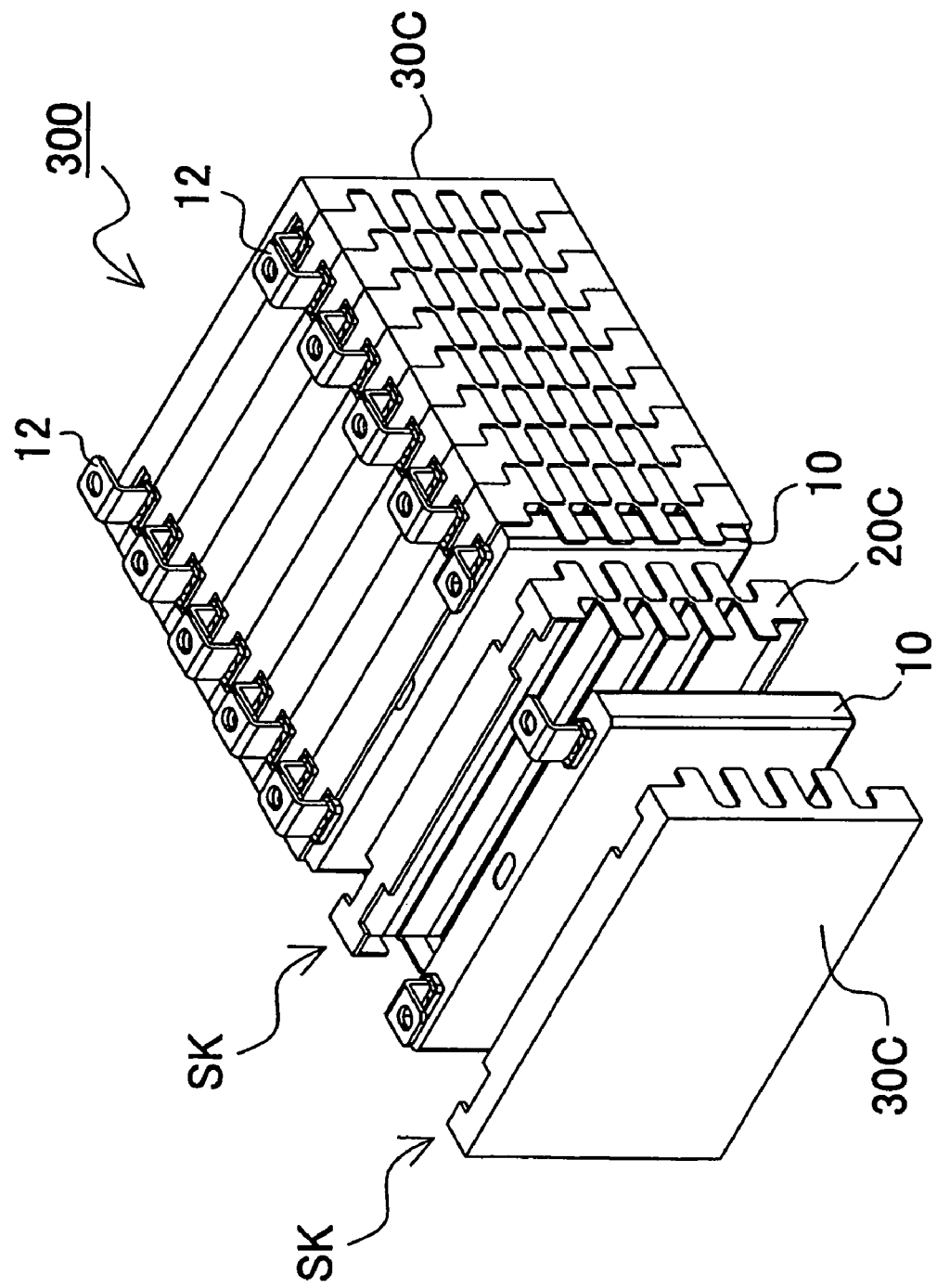
FIG. 10 is an exploded perspective view of the battery pack of FIG. 9.
Figure 11:
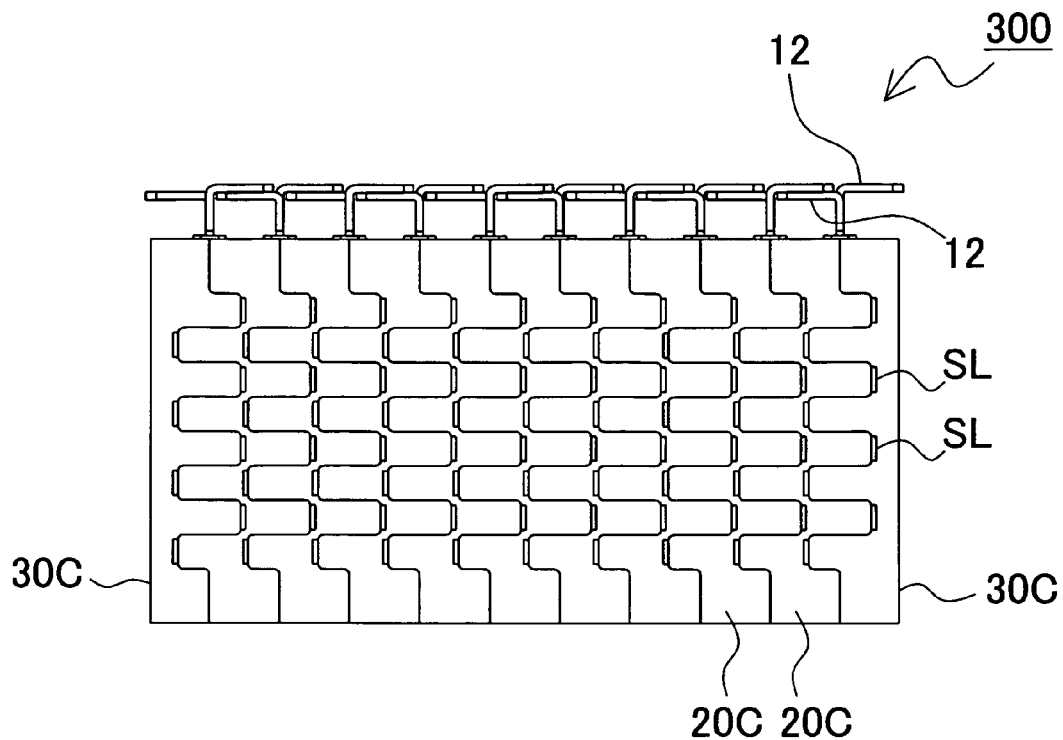
FIG. 11 is a side view of the battery pack of FIG. 9.
Figure 12:
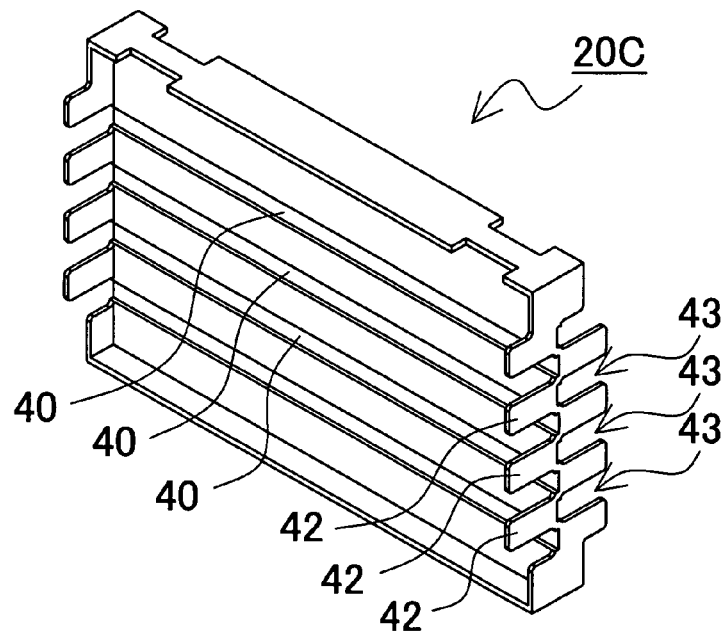
FIG. 12 is a perspective view of a separator in FIG. 10.
Figure 13:
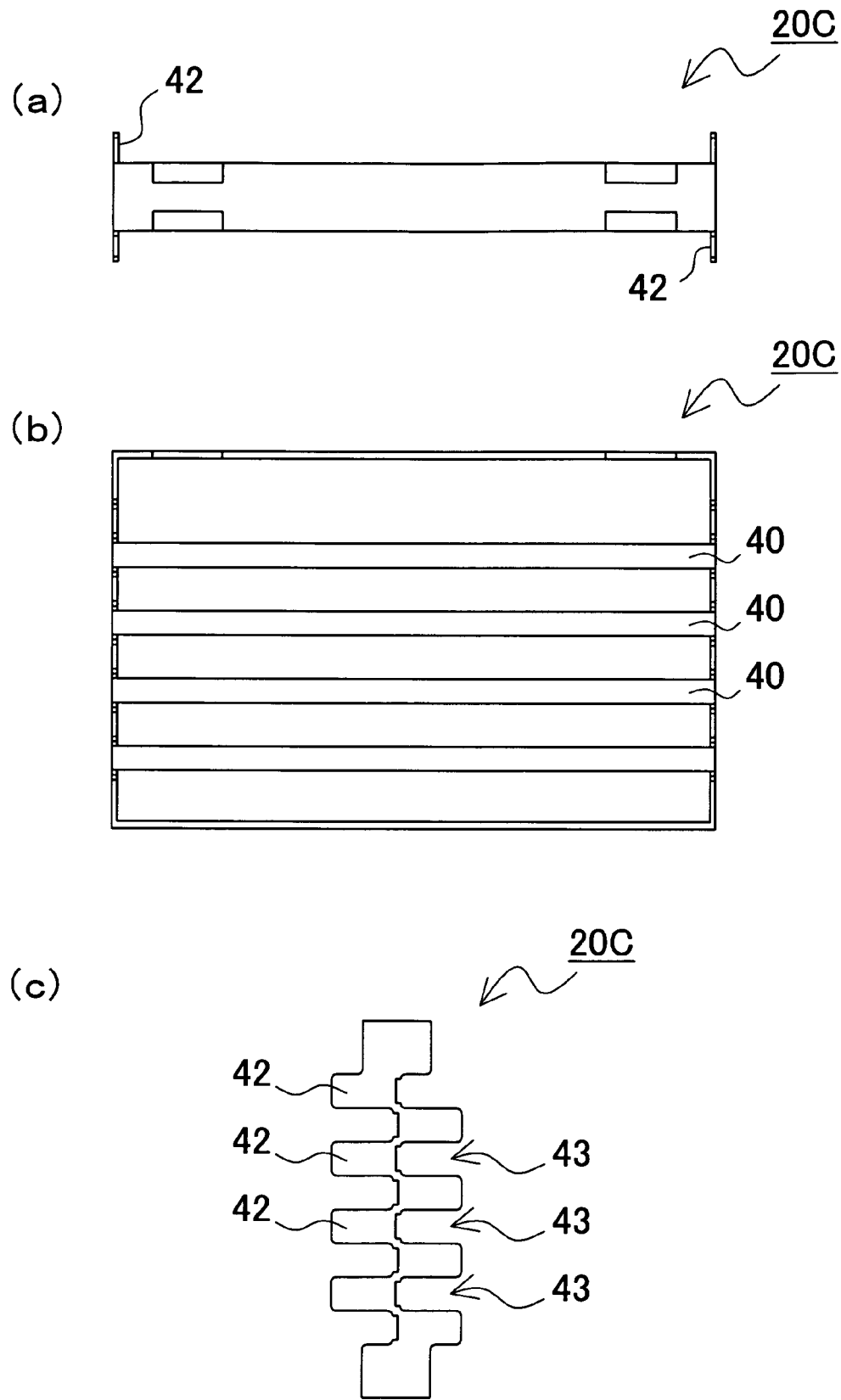
FIG. 13 shows three views of a separator; (a) is a plan view of the separator; (b) is a front view of the separator; and (c) is a side view of the separator.

The interconnecting structure is not limited to fitting interlocking projections and grooves together as described above, and various schemes to suitably link separators can be adopted. As an example of another interconnecting structure, interlocking projections alternately protruding from the rim of the open region of a separator and corresponding interlocking grooves also alternately established can form an interlocking finger structure. A battery pack 300 of the third embodiment is an example of this type of interconnecting structure and is shown in FIGS. 9-13. In these figures, FIG. 9 shows a perspective view of the battery pack 300, FIG. 10 shows an exploded perspective view, FIG. 11 shows a side view, FIG. 12 shows a perspective view of a separator 20C, and FIG. 13 shows three views of a separator 20C. The battery pack 300 is configured in the same fashion as in the first embodiment with a plurality of battery cells 10 and separators 20C alternately stacked together and end plates 30C covering the left and right end planes. It is also similar in that, except for electrode terminal 12 regions, battery cells 10 are covered by interconnecting separators 20C. As necessary, safety valve openings can also be provided.

As shown in the separator 20C of FIG. 12, the side surface plates 22 are alternating projections 42 and grooves 43 formed perpendicular to the bottom surface plate 21 with the gap between projections 42 essentially the same size as the width of a projection 42. These projections 42 and grooves 43 can be linked. The number of projections 42 and grooves 43 is equal and the projections and grooves of adjacent separators 20C are made to interconnect and link separators 20C together. By increasing the number of projections and grooves in this manner, the connection between adjacent separators 20C can be strengthened. Further, stepped region depressions 40 can be formed with a horizontal disposition in the bottom surface plate at the backside of projections 42. As shown in FIG. 9, these stepped region depressions 40 open at side surface plates 22 to form pathways for a cooling medium. In addition, the shape of the end plates 30C is designed to correspond to the finger structure.

Fourth Embodiment

Figure 14:
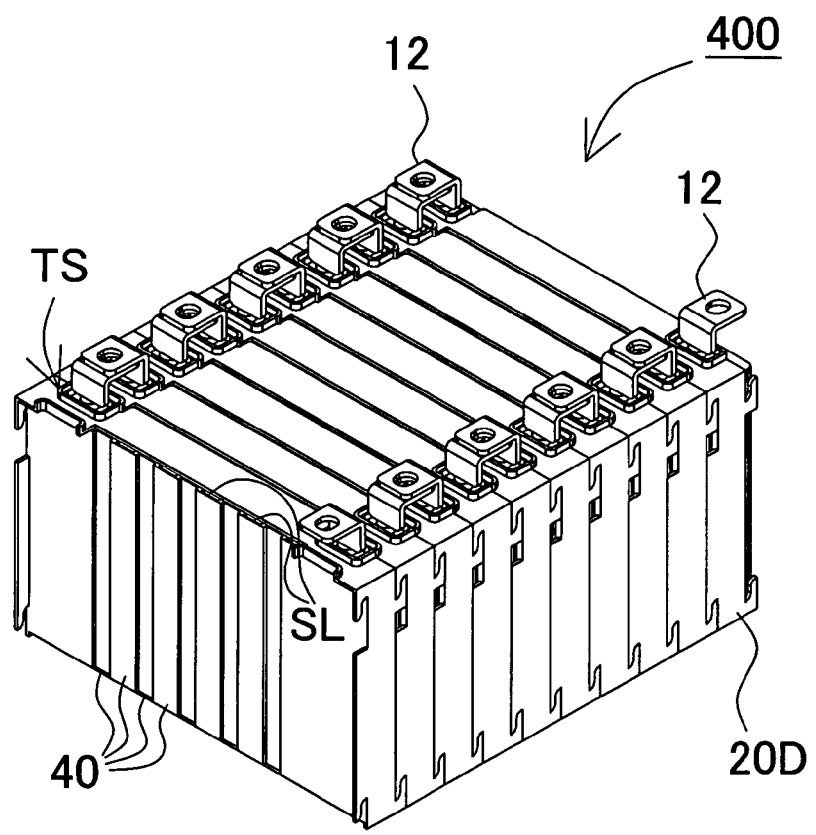
FIG. 14 is a perspective view as seen diagonally from above a battery pack in accordance with a fourth embodiment.
Figure 15:
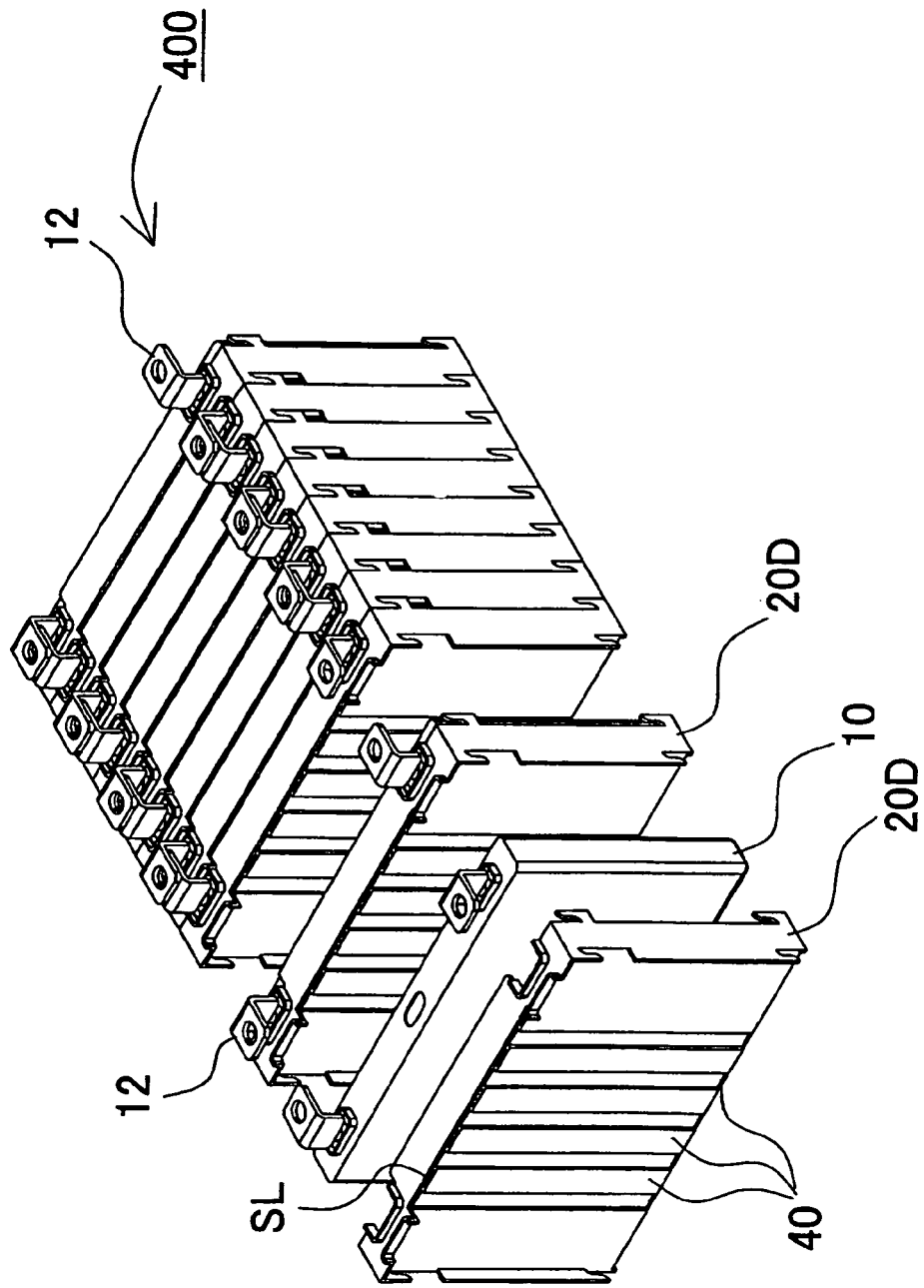
FIG. 15 is an exploded perspective view of the battery pack of FIG. 14.
Figure 16:
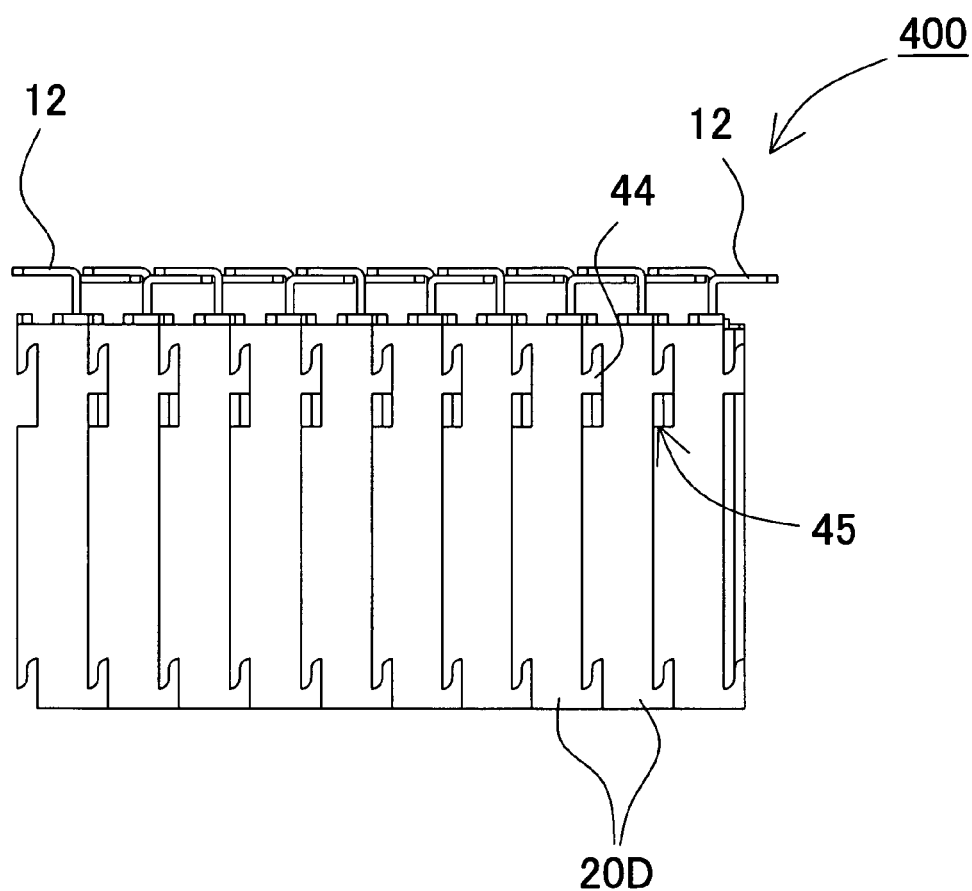
FIG. 16 is a side view of the battery pack of FIG. 14.

Although stepped region depressions were formed in a horizontal direction in the previously described embodiments, they are not limited to the horizontal direction and stepped region depressions may be formed in a vertical direction. This is shown in FIGS. 14-18 as the fourth embodiment. In these figures, FIG. 14 shows a perspective view as seen diagonally from above a battery pack 400 of the fourth embodiment, FIG. 15 shows an exploded perspective view, FIG. 16 shows a side view, FIG. 17 (a) shows a perspective view of a separator 20D as seen from the backside, 17 (b) shows a perspective view as seen from the front side (from the open region side), and FIG. 18 shows three views of a separator 20D. The battery pack 400 shown in these figures is configured in the same fashion as embodiments 1-3 with a plurality of battery cells 10 and separators 20D alternately stacked together and end plates covering the left and right end planes. Here, the end plates are omitted in the figures.

Stepped region depressions 40 open at the upper surface plate 23 and the lower surface plate 24. Correspondingly, stepped region depressions 40 are formed in the bottom surface plate 21 in the vertical direction. By configuring stepped region depressions 40 in the vertical direction, when battery cells 10 are oriented in an upright disposition, thermal convection develops easily and the ability to radiate heat improves. Further, the direction of flow of coolant such as cooling air can be in the same direction as the coolant heat convection allowing efficient heat transfer and cooling. However, when cooling air is forced in this direction, electrode terminals 12 adjacent to stepped region depression openings can be exposed to the cooling air. Since the generation of condensation and rust due to particulates included in the cooling air is a concern, it is desirable to separate or divide via partition walls, etc. stepped region depression 40 openings and electrode terminals 12.

Figure 17:
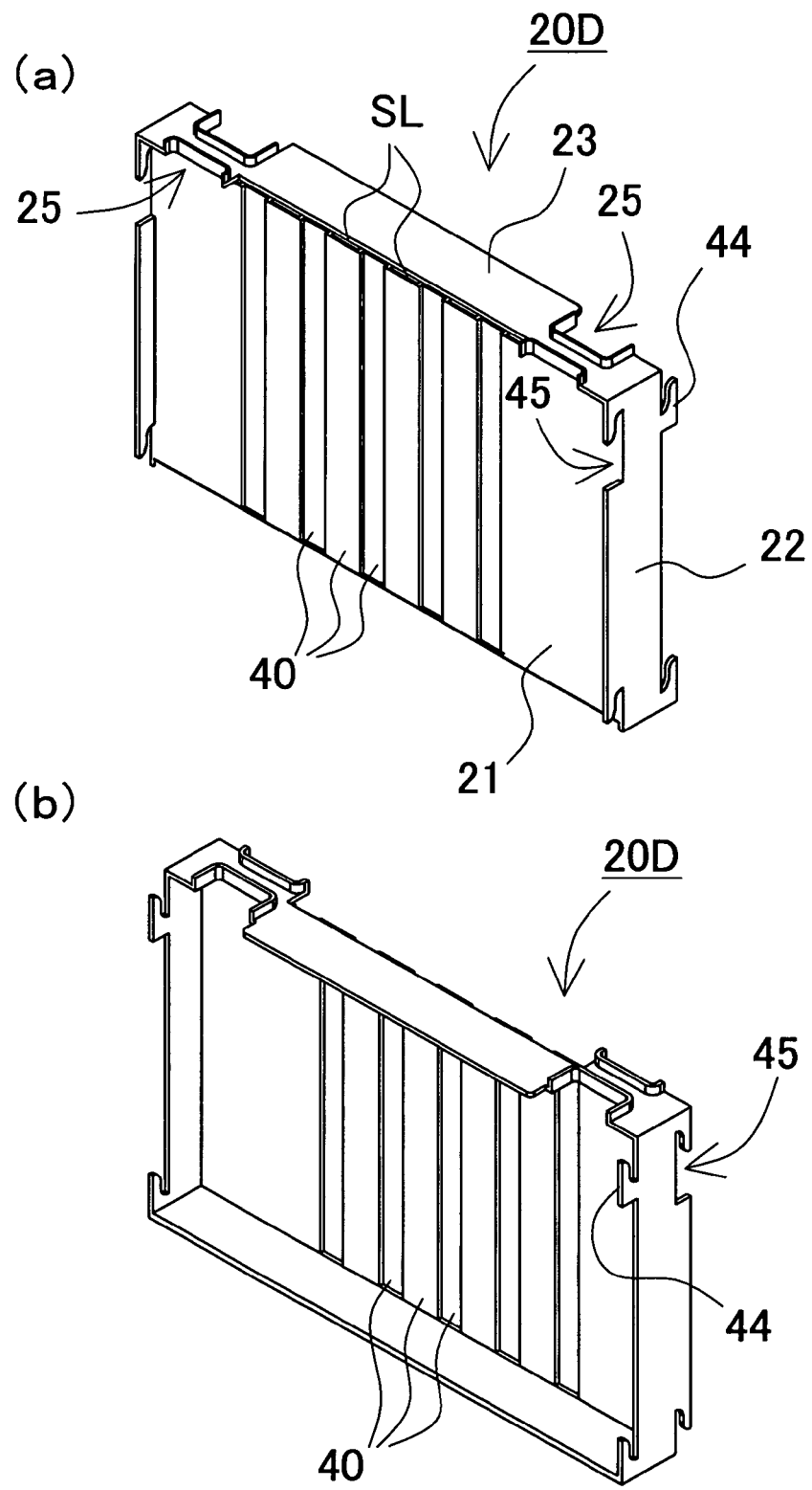
FIG. 17 (a) is a perspective view as seen from the backside of the separator; and (b) is a perspective view as seen from the front side of the separator.
Figure 18:
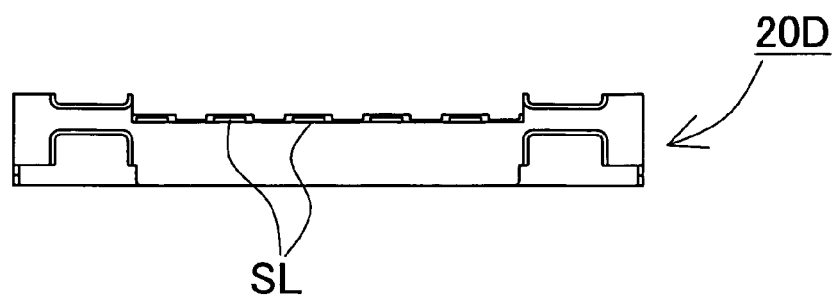
FIG. 18 shows three views of a separator; (a) is a plan view of the separator; (b) is a front view of the separator; and (c) is a side view of the separator.
Figure 18:
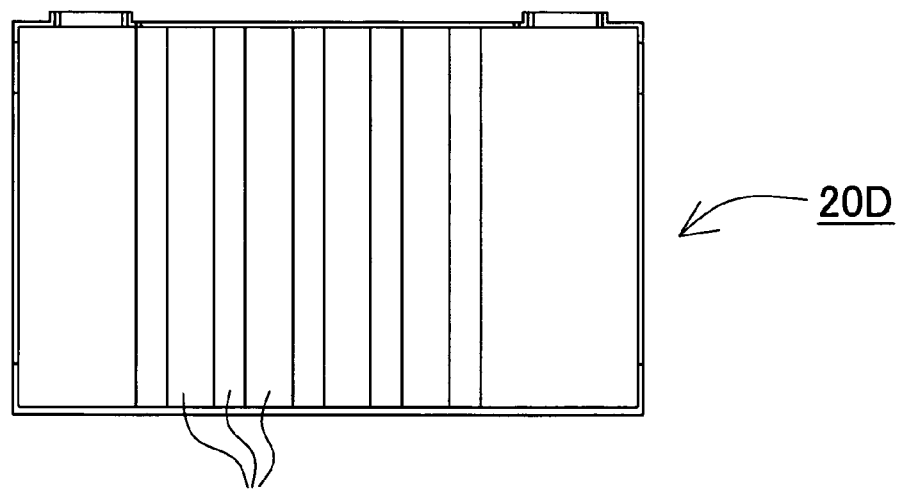
Figure 18:
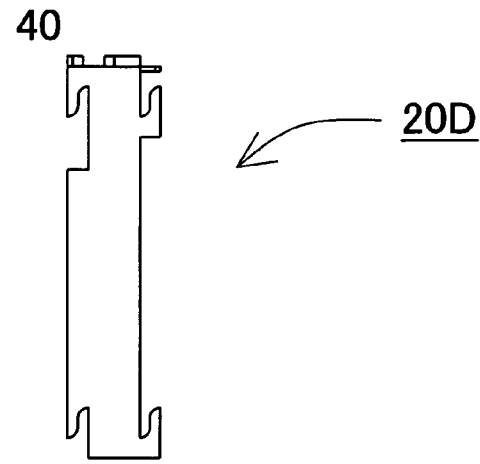

As an interconnecting structure, the separator 20D shown in FIG. 17 has interlocking projections that are key shaped regions 44 and interlocking grooves that are slits 45, which mate with those key shaped regions 44. By inserting key shaped regions 44 into interlocking slits 45, reliable connection can be achieved. Although key shaped regions are established at the four corners of the open region in this example, they can also be formed at two diagonal corners. Reducing the number of interlocking projections reduces manufacturing cost and processing, but connection strength decreases. Therefore, the number, location, and shape of interlocking projections are selected corresponding to the required connection strength.

Fifth Embodiment

Figure 19:
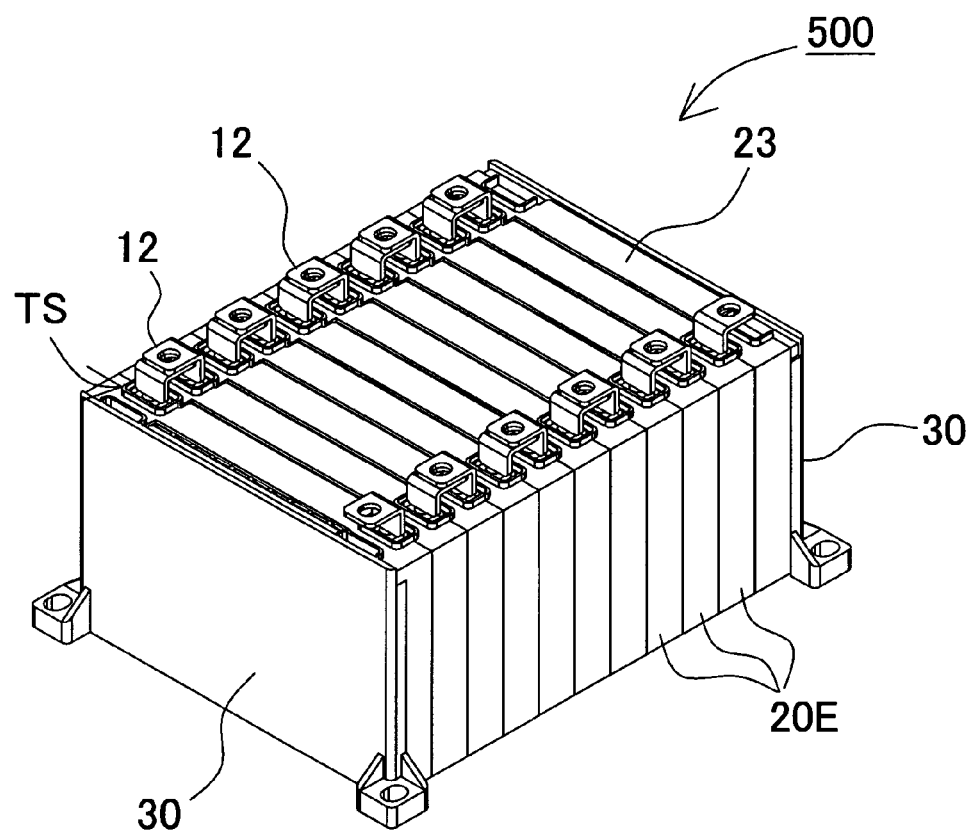
FIG. 19 is a perspective view as seen diagonally from above a battery pack in accordance with a fifth embodiment.
Figure 20:
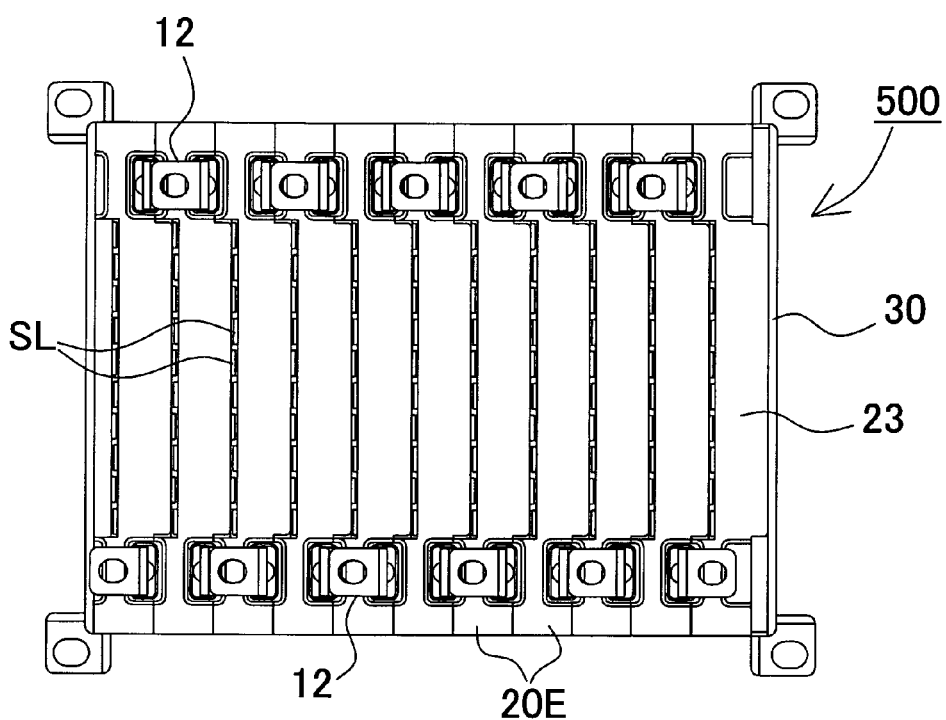
FIG. 20 is a plan view and a bottom view of the battery pack of FIG. 19.
Figure 20:
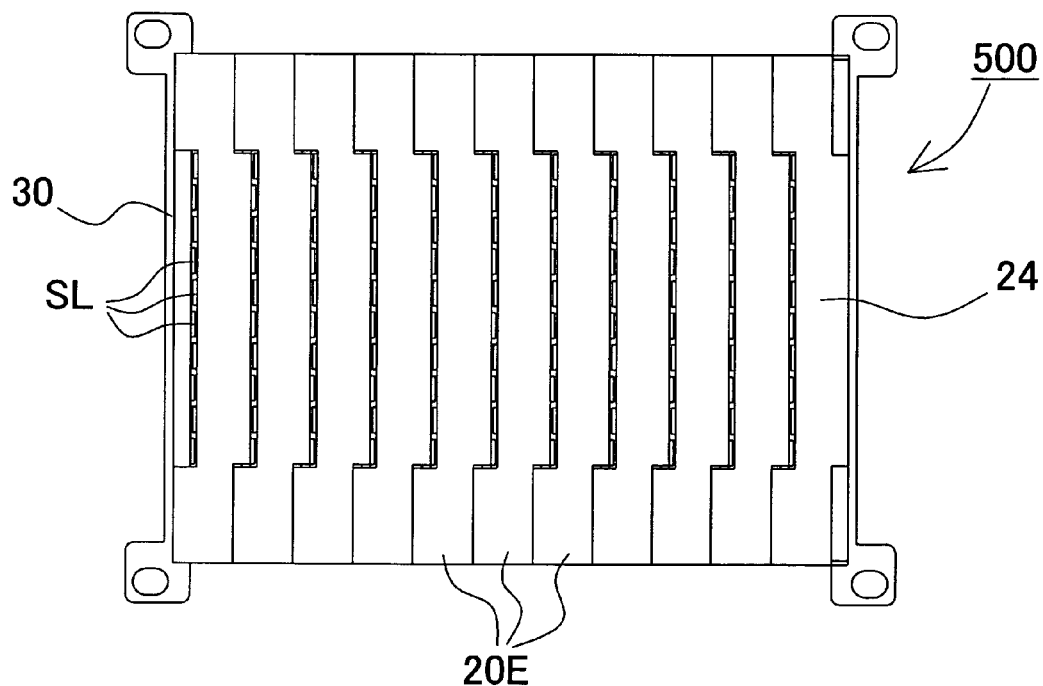
Figure 21:
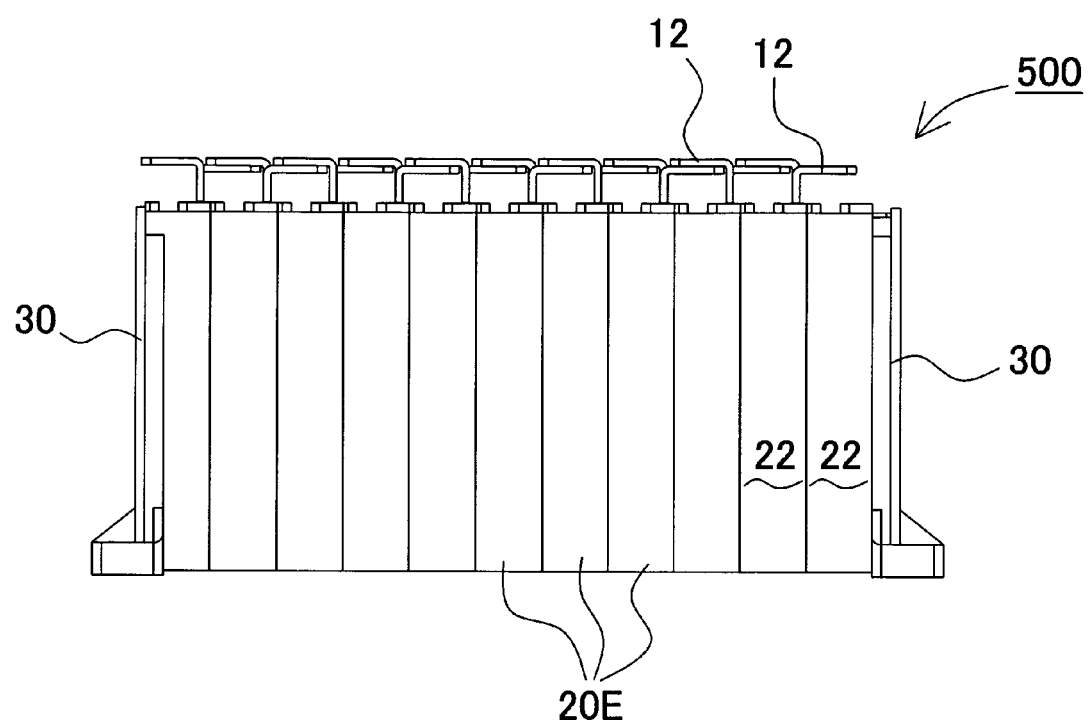
FIG. 21 is a side view of the battery pack of FIG. 19.

In previously described embodiments 1-4, separator interconnecting structure and terminal feed-through openings TS were established on different surfaces of a separator. Specifically as shown in FIG. 1, the interconnecting structure is established on the side surfaces of the battery pack 100, and the terminal feed-through openings TS are disposed on the upper surface of the battery pack 100. However, the battery pack is not limited to this configuration and both the interconnecting structure and terminal feed-through openings TS can be positioned on the same separator surface. An example of this is shown in FIGS. 19-22 showing the fifth embodiment. In these figures, FIG. 19 shows a perspective view as seen diagonally from above a battery pack 500 of the fifth embodiment, FIG. 20 shows a plan view and a bottom view, FIG. 21 shows a side view, FIG. 22 (a) shows a perspective view as seen from the backside of a separator 20E and FIG. 22 (b) shows a perspective view as seen from the front side (from the open region side) of the separator 20E. The battery pack 500 is configured in the same fashion as in embodiments 1-4 with a plurality of battery cells 10 and separators 20E alternately stacked together and end plates covering the left and right end planes.

Figure 22:
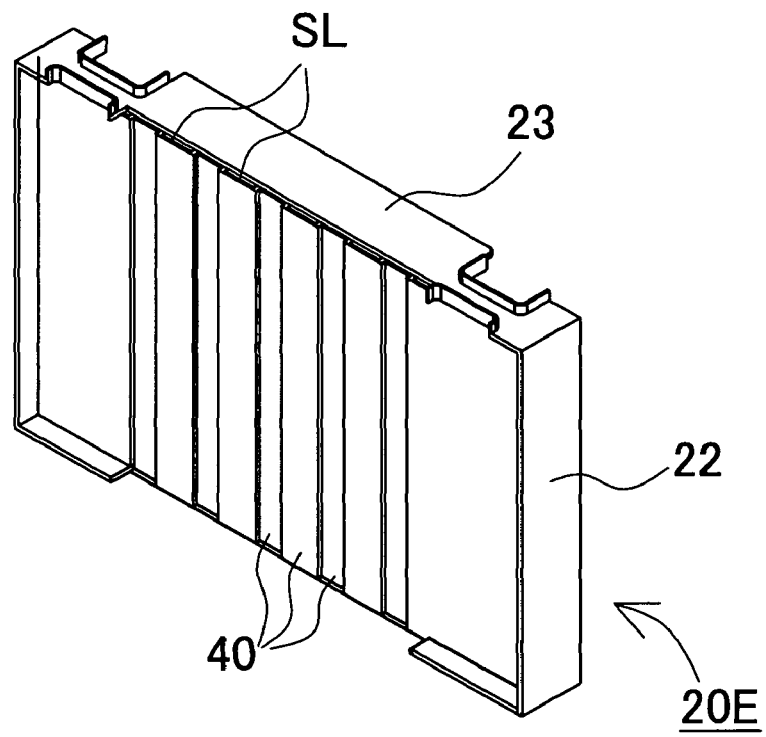
FIG. 22 (a) is a perspective view as seen from the backside of the separator, and (b) is a perspective view as seen from the front side of the separator.
Figure 22:
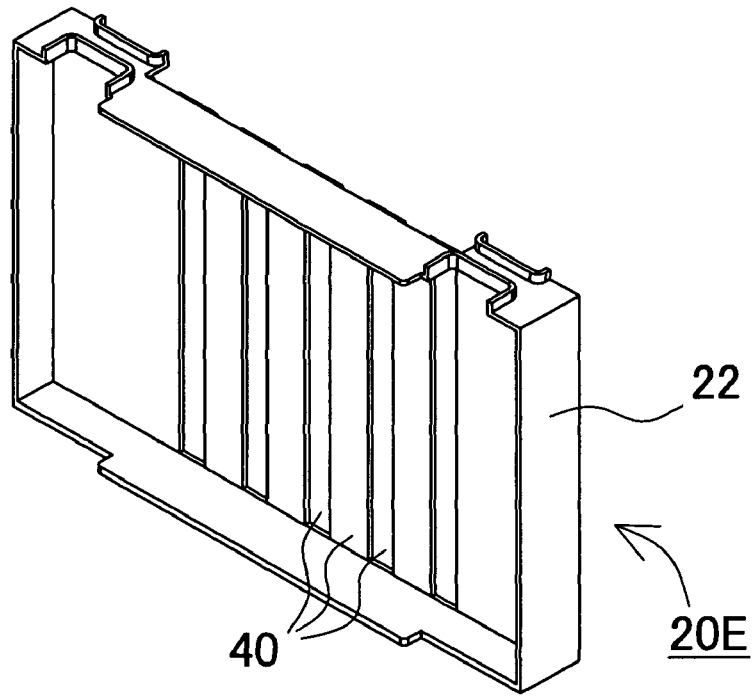

In the interconnecting structure of battery pack 500, lengthwise edges of the upper surface plate 23 and lower surface plate 24 of the separator 20E have interlocking projections protruding from one side and interlocking grooves established on the other side. Separators 20D are designed to interconnect with other separators 20D by connecting interlocking projections and interlocking grooves. In the example of FIG. 22 (*a*), an interlocking projection is formed upward (to the right in FIG. 22 (*a*)) on the upper surface plate 23, and an interlocking groove is formed downward (to the left in FIG. 22 (*a*)). In this example, to separate the interconnecting structure from the cutouts 25 for electrode terminals 12, the points where an interlocking projection juts outward and an interlocking groove cuts inward are positioned next to electrode terminal cutouts 25.

In the first embodiment shown in FIG. 4, a side surface plate 22" edge was aligned with the bottom surface plate 21 to open stepped region depressions 40 at the side surface plates 22. Since there is no need to open stepped region depressions 40 at side surface plates 22 in the fifth form of embodiment, the bottom surface plate 21 is fixed at a central position on the side surface plates 22. However, to open the ends of stepped region depressions 40 at the base of interlocking grooves in the upper surface plate 23 and lower surface plate 24, the bottom surface plate 21 is fixed to align it with the base of the interlocking grooves. The depth of an interlocking groove (and the height of an interlocking projection) is designed to be less than half the height of the upper surface plate 23. Consequently, in the example of FIGS. 22 (*a*) and (*b*), the bottom surface plate 21 is fixed to the side surface plates 22 at positions downward (to the left in FIG. 22 (*a*)) from center. The location of the bottom surface plate 21 is determined by the height and depth of the interlocking projection and interlocking groove on the upper surface plate 23. In this manner, the interconnecting structure and terminal feed-through openings TS are all together on the upper surface plate 23 of a separator 20E. This simplifies side surface plate structure and allows space savings in the width direction.

In the battery packs constructed in accordance with the present embodiment, separator alignment is simplified by providing a separator interconnecting structure. In addition, by covering battery cell exteriors with separators, battery cells can be protected and events such as short circuits can be avoided.

The battery pack of the present invention is suitable in vehicle applications, such as an electric automobile or hybrid car, as a vehicle power source.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2006-356318 filed in Japan on Dec. 28, 2006, the content of which is incorporated herein by reference.

What is claimed is:

1. A battery pack comprising:
    a plurality of battery cells connected in series and/or parallel, each of the battery cells being encased in a rectangular external case, and comprising at least one electrode terminal extending from a top surface of the external case; and
    a plurality of separators with electrical and thermal insulating properties that cover battery cell exteriors except the electrode terminals of the battery cells;
    wherein each of said separator intervenes between adjacent battery cells such that battery cell external cases contact both sides of the separator, and the electrode terminals are exposed when the battery cell external cases are covered by the separators,
    wherein each of the separators is formed in the shape of an open box having a bottom, the bottom being formed by a bottom surface plate that is slightly larger but essentially the same shape as a side of the adjacent battery cell,
    wherein the box shape of each separator is formed by upper, lower and side surface plates that extend perpendicularly from the bottom surface plate;
    wherein the upper surface plate of the separator has cutouts at each longitudinal side of the upper surface plate, the cutouts being open in an inward direction from both longitudinal sides of the upper surface plate and being opposed with each other in a width direction of the upper surface plate, and
    wherein each of the separators is configured so that the upper surface plates cover the top surfaces of the external cases, and the cutouts adjacent upper surface plates join to form terminal feed-through openings by interconnecting adjacent separators, each of the terminal feed-through openings surrounding a perimeter of only one of the electrode terminals to permit passing of the electrode terminal through the separators.

2. The battery pack as recited in claim 1, wherein the battery cells are rectangular batteries.

3. The battery pack as recited in claim 2, wherein the battery cells are rectangular batteries, each of the rectangular batteries having a rectangular external case with side surfaces having truncated corners and positive and negative electrode terminals extending from the top surface.

4. The battery pack as recited in claim 2, wherein each of the battery cells comprises a positive electrode terminal and a negative electrode terminal extending from a top surface of the external case, and each positive and negative electrode terminal is bent in an L-shape and has a connecting hole opened through the bent part of the terminal, the positive and negative electrode terminals are bent in opposite directions and are formed in sizes and shapes making it possible to directly connect electrode terminals of adjacent battery cells.

5. The battery pack as recited in claim 2, wherein the battery cells have terminal ribs established in an upright disposition surrounding the perimeter of each electrode terminal, and thereby the spread of electrolyte is prevented via these terminal ribs.

6. The battery pack as recited in claim 1, wherein the separators have an interconnecting structure that fits adjacent separators together, and battery cell storage spaces are formed by connecting the separators via the interconnecting structure.

7. The battery pack as recited in claim 1, wherein the box shape is formed by side surface plates on the left and right, upper and lower surface plates above and below, the upper, lower and side surface plates extend vertically from the bottom surface plate; the space established by the upper, lower and side surface plates forms one part of a battery cell storage space.

8. The battery pack as recited in claim 7, wherein terminal feed-through openings are formed as approximately rectangular cutouts in part of the upper surface plates that form the upper surface of the separators.

9. The battery pack as recited in claim 6, wherein each of the separators is formed so that the open region of the open box shape has a U-shaped cross-section where the open region is designed with a size and shape that can accommodate one of the battery cells when the separators are fit together and linked, the interconnecting structure disposes the separators such that the open region of one box-shaped separator is closed off with the bottom surface plate of an adjacent separator.

10. The battery pack as recited in claim 9, wherein the interconnecting comprises interlocking projections formed on a rim at the open region of a separator and interlocking grooves that mate with the interlocking projections.

11. The battery pack as recited in claim 10, wherein the interlocking projections are formed at four corners of the open region or at least at two diagonal corners.

12. The battery pack as recited in claim 1, wherein in the bottom surface of the open region of the separator where the external case of the enclosed battery cell contacts the separator surface, a plurality of stepped regions in the form of depressions are established at given intervals in an approximately parallel fashion, and the ends of the stepped region depressions are open at the side surfaces of the separator.

13. The battery pack as recited in claim 12, wherein in each of the separators, the bottom surface plate, which is the bottom surface of the open region of the separator, can be made with bends and folds to establish a cross-section having continuous depressions and projections and forming a bottom surface plate with stepped region depressions on both sides.

14. The battery pack as recited in claim 12, wherein the direction of the stepped region depressions is established parallel to the upper surface of the enclosed battery cell.

15. The battery pack as recited in claim 12, wherein the direction of the stepped region depressions is established perpendicular to the upper surface of the enclosed battery cell.

16. The battery pack as recited in claim 1, wherein adjacent ones of the separators define has a safety valve opening formed at a location corresponding to a location of a safety valve provided in the battery cell contained inside.

17. The battery pack as recited in claim 1, wherein the separators are formed from resin materials.

18. The battery pack as recited in claim 1, wherein electrolyte-absorbing sheet is disposed around the battery cell electrode terminals.

19. The battery pack as recited in claim 1, wherein the separators have terminal sidewalls positioned to surround the battery cell electrode terminals.

20. The battery pack as recited in claim 19, wherein at least one section of the terminal sidewalls is opened and drain sidewalls are established so as to extend to side surfaces of the separator.

* * * * *